US010095971B2

(12) United States Patent
Charon

(10) Patent No.: US 10,095,971 B2
(45) Date of Patent: Oct. 9, 2018

(54) TEMPERATURE DETECTION SYSTEM USING A RADIO-TAG COMPRISING A THERMISTOR

(71) Applicant: Airbus Operations S.A.S., Toulouse (FR)

(72) Inventor: Pierre Charon, Toulouse (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 15/825,713

(22) Filed: Nov. 29, 2017

(65) Prior Publication Data

US 2018/0174014 A1 Jun. 21, 2018

(30) Foreign Application Priority Data

Dec. 16, 2016 (FR) .................................. 16 62594

(51) Int. Cl.
| *G06K 19/07* | (2006.01) |
| *G06K 19/077* | (2006.01) |
| *G01K 3/04* | (2006.01) |
| *G06K 7/10* | (2006.01) |
| *H01Q 1/22* | (2006.01) |
| *G01K 1/02* | (2006.01) |
| *G01K 7/18* | (2006.01) |

(52) U.S. Cl.
CPC ....... *G06K 19/07749* (2013.01); *G01K 1/024* (2013.01); *G01K 3/04* (2013.01); *G01K 7/18* (2013.01); *G06K 7/10336* (2013.01); *G06K 19/0717* (2013.01); *H01Q 1/2216* (2013.01); *H01Q 1/2225* (2013.01); *H04Q 2209/47* (2013.01)

(58) Field of Classification Search
CPC .................. G06K 19/067; G06K 19/0717
See application file for complete search history.

(56) References Cited

U.S. PATENT DOCUMENTS

| 2010/0079288 A1* | 4/2010 | Collins ............ G06K 19/0717 340/572.4 |
| 2010/0225482 A1* | 9/2010 | Kasai ............... G06K 19/0717 340/572.1 |
| 2011/0208182 A1* | 8/2011 | Szasz .................... A61N 1/403 606/33 |

FOREIGN PATENT DOCUMENTS

| DE | 10 2009 005100 A1 | 7/2010 |
| EP | 2 182 581 A1 | 5/2010 |

* cited by examiner

*Primary Examiner* — Carlos E Garcia
(74) *Attorney, Agent, or Firm* — Lerner, David, Littenberg, Krumholz & Mentlik, LLP

(57) ABSTRACT

An onboard system for detecting a temperature of an element includes a radio-tag, the radio-tag being fixed onto the element and having an antenna, the antenna having a load, and a radio-tag reader. The radio-tag reader is designed to emit an interrogation signal and to receive in return a response signal coming from the radio-tag. The load includes a thermistor and the radio-tag reader is adapted for determining a gain and/or a phase-shift between the interrogation signal and the response signal and for deducing a temperature of the element therefrom.

7 Claims, 2 Drawing Sheets

TEMPERATURE DETECTION SYSTEM USING A RADIO-TAG COMPRISING A THERMISTOR

FIELD OF THE INVENTION

The present invention relates to the field of systems onboard an aircraft, and more particularly that of systems for detecting overheating of an element of the aircraft (Over-Heat Detection System).

BACKGROUND OF THE INVENTION

An aircraft comprises systems allowing the detection of a potential overheating of an element, such as an engine or a nozzle, where said overheating may be linked to an anomaly, for example a fire. It is common to use temperature sensors comprising a eutectic. A eutectic is a mixture of two pure bodies which melts and solidifies at a constant temperature, for example a mixture of water and salt. Such a mixture therefore goes from the solid state to the liquid state, and vice versa, at a predefined constant temperature. A sensor may take the form of a cable, comprising a conducting core and an envelope, which is also conducting. Inside of this cable, a eutectic is present between the core and the envelope. This eutectic is typically an electrical insulator when it is in the solid state, and becomes an electrical conductor in the liquid state. A water and salt mixture is commonly used, which mixture is an electrical conductor in the liquid state, the conductivity depending on the proportion of salt in the mixture. The central core is typically made of nickel, and the external envelope is typically a superalloy, in other words an alloy containing a large quantity of nickel and of chrome. An electrical voltage, typically a low-frequency alternating voltage, is applied between the central core and the external envelope. When the eutectic is in the solid state, no current can flow, the eutectic being an electrical insulator in this state. On the other hand, when a section of the cable is heated to a temperature such that the eutectic contained within the cable goes into the liquid state, an electrical current can flow between the central core and the external envelope. It is thus possible to detect this electrical current and to deduce from this that at least one section of the cable is being subjected to a temperature higher than the temperature of fusion of the eutectic.

This type of overheating detector, using a eutectic, has numerous drawbacks. First of all, the installation of such sensors in an aircraft poses numerous constraints owing to the rigidity of the detector cables. This rigidity is inherent to the necessity of having a central core and an external envelope composed of an electrically conducting material that can withstand high temperatures, very often a quite inflexible metal material. These cables thus frequently have constraints on the radius of curvature that they can take, particularly as regards the connectors allowing their connection to the overheat detection system. Such sensors must also be installed taking into account a potential expansion of the elements onto which they are mounted. On the other hand, the eutectic included in the sensor must be designed to withstand the environmental constraints specific to an aircraft, particularly vibrations. More generally, such sensors do not reveal at which point of the detector cable the overheating has occurred. Such sensors do not allow an overheating to be localized more precisely than on the cable, which may potentially be quite long.

It is therefore necessary to provide a system allowing these drawbacks to be overcome.

BRIEF SUMMARY OF THE INVENTION

The invention relates to an onboard system for detection of a temperature of an element, the system comprising a radio-tag, the radio-tag being fixed onto the element and comprising an antenna, the antenna comprising a load, a radio-tag reader, the radio-tag reader being designed to emit an interrogation signal and to receive in return a response signal coming from the radio-tag, the load comprises a thermistor and the radio-tag reader is adapted for determining a gain and/or a phase-shift between the interrogation signal and the response signal and for deducing a temperature of the element therefrom.

Advantageously, the system allows a measurement of the temperature of an element onto which is fixed, or into which is integrated, a radio-tag whose antenna incorporates a load comprising a thermistor. The reading, by an appropriate radio-tag reader, of the radio-tag allows the temperature of the element to be inferred. This system allows the temperature to be determined at a precise point on an element and, consequently, a possible overheating to be precisely located. This system also allows a remote reading of the temperature of the element, the reading being made via radio waves. It is thus possible to access the temperature of a non-accessible element, for example because the element is placed behind a layer of insulator. Moreover, a radio-tag of the RFID (Radio-Frequency Identification) type, adapted with an integrated thermistor, may be produced for a moderate cost.

According to one complementary embodiment of the invention, the radio-tag reader is adapted for accessing a database of correspondence between, on the one hand, a temperature and, on the other, the gain and/or the phase-shift between the interrogation signal and the response signal.

Advantageously, the system comprises a database allowing the correspondence between, on the one hand, a temperature and, on the other, the gain and/or the phase-shift between the interrogation signal and the response signal. It is accordingly not necessary to individually calibrate each radio-tag or radio-tag reader.

According to one complementary embodiment of the invention, the thermistor comprises a platinum resistance.

Advantageously, the thermistor used is a thermistor conventionally used for producing temperature probes, which allows the costs to be reduced.

The invention also relates to a radio-tag for an onboard system for detecting a temperature of an element, the radio-tag being able to be fixed onto the element and comprising an antenna, the antenna comprising a load comprising a thermistor.

Advantageously, the radio-tag emits a response signal, in response to an interrogation signal emitted by a radio-tag reader, whose gain and/or phase-shift depend(s) on the temperature of the thermistor.

The invention also relates to a radio-tag reader for an onboard system for detecting a temperature of an element, the radio-tag reader being designed to emit an interrogation signal and to receive in return a response signal coming from a radio-tag fixed onto the element, to determine a gain and/or a phase-shift between the interrogation signal and the response signal, to find in a database a correspondence between, on the one hand, a temperature and, on the other, the gain and/or the phase-shift between the interrogation signal and the response signal and to deduce a temperature of the element as a function of the gain and/or of the phase-shift between the interrogation signal and the response signal.

Advantageously, the radio-tag reader can deduce a temperature from the reading of an appropriate radio-tag comprising a thermistor.

According to one complementary embodiment of the invention, the radio-tag reader is furthermore adapted for determining an estimation of a speed of the air flow as a function of the measured variation of the temperature over time.

The invention also relates to a method for detecting a temperature of an element, the element comprising a radio-tag, the radio-tag comprising a load comprising a thermistor, the method being executed by a radio-tag reader and comprising the steps of:

emitting an interrogation signal, receiving in return a response signal coming from the radio-tag, determining a gain and/or a phase-shift between the interrogation signal and the response signal, deducing a temperature as a function of the gain and/or phase-shift.

According to one complementary embodiment of the invention, in order to carry out the step for deducing a temperature as a function of the gain and/or phase-shift, the method comprises a step for finding in a database a correspondence between, on the one hand, a temperature and, on the other, the gain and/or the phase-shift between the interrogation signal and the response signal.

The invention also relates to a computer programme, which can be stored on a medium and/or downloaded from a communications network, in order to be read by a processor. This computer programme comprises instructions for implementing all or part of the steps mentioned hereinbelow, when said programme is executed by the processor.

The invention also relates to a means for storing information comprising such a computer programme.

BRIEF DESCRIPTION OF THE DRAWINGS

The aforementioned features of the invention, together with others, will become more clearly apparent from reading the following description of one exemplary embodiment, said description being presented with reference to the appended drawings, amongst which.

DETAILED DESCRIPTION

Figure 1:
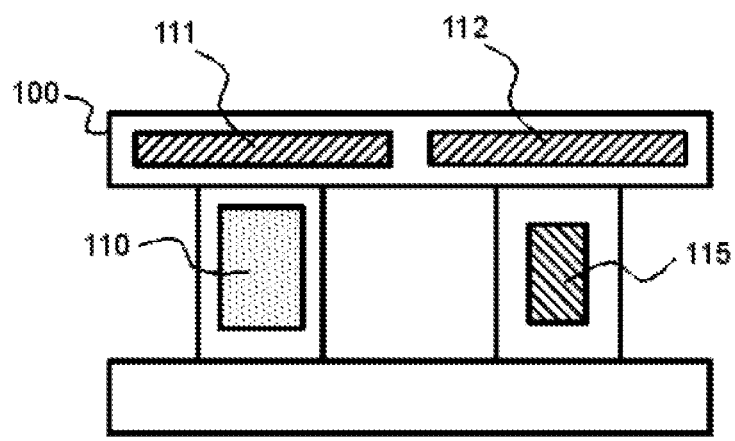
FIG. 1 illustrates schematically a radio-tag for an onboard system for detecting a temperature of an element, the radio-tag being fixed onto the element, according to one embodiment of the invention.

FIG. 1 illustrates schematically a radio-tag 100 for an onboard system for detecting a temperature of an element, the radio-tag being fixed onto the element, according to one embodiment of the invention. The element is typically an element of an aircraft whose temperature it is desired to determine.

In the illustration in FIG. 1, the radio-tag is integrated into the element whose temperature is to be measured. The element may be an air outlet nozzle of a conduit, which indirectly allows the temperature of the fluid transiting via said conduit to be measured. Advantageously, it is then possible to replace an element, an existing air outlet nozzle for example, by another element comprising the radio-tag 100. It is thus possible to install a temperature detection system at a lower cost by only replacing this single element.

The radio-tag 100 for an onboard system for detecting a temperature of an element may therefore be fixed onto or integrated into the element. The radio-tag 100 comprises a microcontroller 110. The radio-tag 100 comprises an antenna, for example a dipole composed of the parts 111 and 112. The antenna comprises a load 115 comprising a thermistor. The parts 111 and 112 of the dipole constituting the antenna may be formed by a deposition of a layer of copper on the element. The architecture of the radio-tag 100 is conventional, with the notable difference that the load 115 is a thermistor. The load 115 is for example composed of a platinum resistance. Thus, the gain and/or phase-shift of the antenna depend(s) on the temperature of the load 115 of the antenna. The radio-tag 100 is for example an RFID (Radio-Frequency Identification) or NFC (Near Field Communication) tag.

Figure 2:
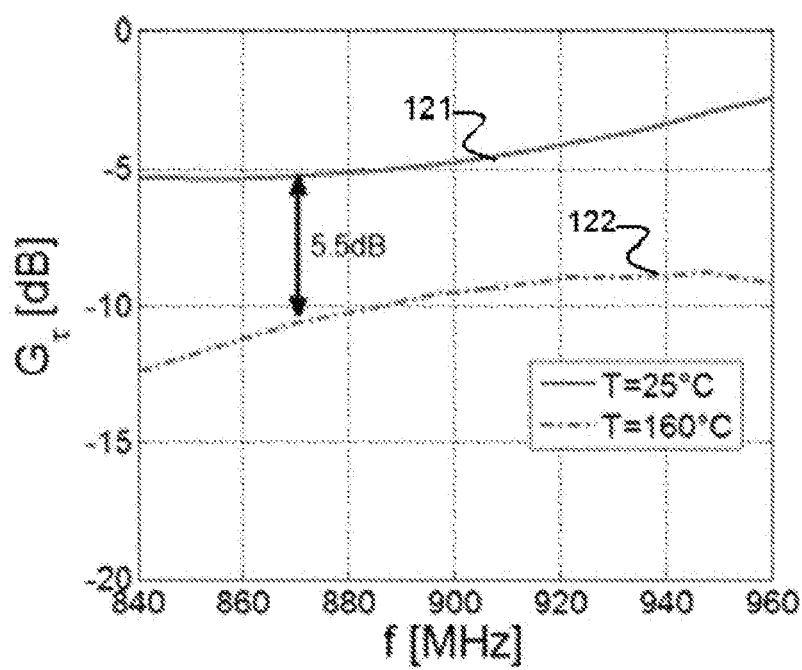
FIG. 2 illustrates the effect of the temperature on the gain of an antenna comprising a load, the load comprising a thermistor, according to one embodiment of the invention.

FIG. 2 illustrates the effect of the temperature on the gain of an antenna comprising a load, the load comprising a thermistor according to one embodiment of the invention.

The curves 121 and 122 represent the gain (in decibels—dB—on the vertical axis) of an antenna comprising a load, the load comprising a thermistor, as a function of a frequency (in megahertz—MHz—on the horizontal axis). The curve 121 represents the gain of the antenna when the temperature of the load, in other words of the thermistor, is 25° C. The curve 122 represents the gain of the antenna when the temperature of the load is 160° C. Thus, at a frequency of 800 MHz, it is observed that the gain of the antenna is 5 dB higher at a temperature of 25° C. with respect to a temperature of 160° C. The attenuation of the gain with the increase in the temperature allows the temperature to be accessed indirectly, a table of correspondence between the gain of the antenna and the temperature having to be predetermined, for example during a step for calibrating the radio-tag 100.

Figure 3:
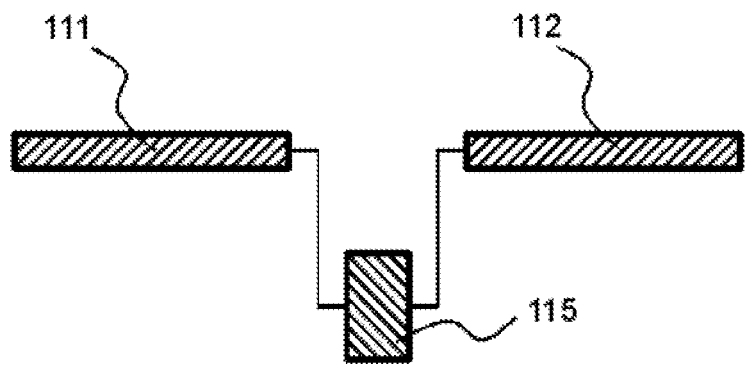
FIG. 3 illustrates schematically the architecture of an antenna of a radio-tag according to one embodiment of the invention.

FIG. 3 illustrates schematically the architecture of an antenna of a radio-tag 100 according to one embodiment of the invention. Here, the antenna is composed of the parts 111 and 112 of a dipole, these parts 111 and 112 being connected to the load 115. The load 115 comprises a thermistor, for example a platinum resistance. The load 115 may consist of a temperature probe, for example a probe called "Pt100" comprising a platinum resistance.

The antenna illustrated in FIG. 3 thus allows an antenna whose gain and/or phase-shift depends on the temperature of the load 115 to be obtained.

Figure 4:
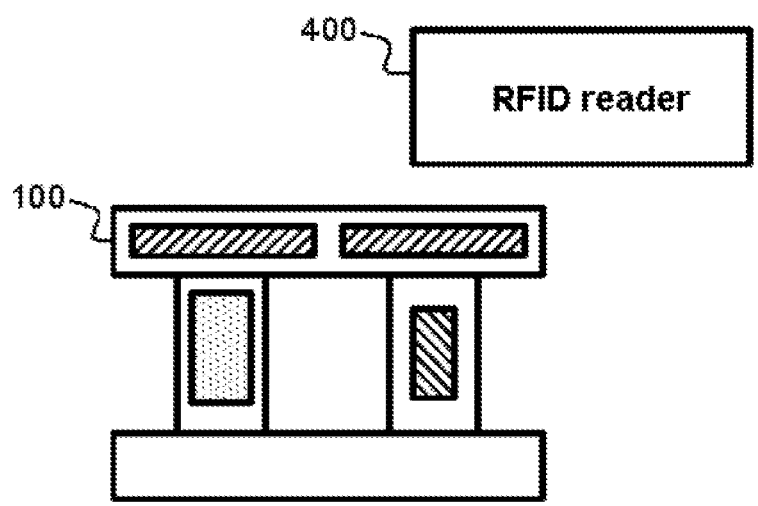
FIG. 4 illustrates schematically an onboard system for detecting a temperature of an element, the system comprising a radio-tag fixed onto the element and a radio-tag reader, according to one embodiment of the invention.

FIG. 4 illustrates schematically an onboard system for detecting a temperature of an element, the system comprising a radio-tag 100 fixed onto the element and a radio-tag reader 400, according to one embodiment of the invention.

The radio-tag reader 400, for example a reader of the RFID tag type, is designed to emit an interrogation signal and to receive in return a response signal coming from a radio-tag, for example the radio-tag 100.

The radio-tag reader 400 is furthermore adapted for determining a gain and/or a phase-shift between an interrogation signal emitted by the radio-tag reader 400 and a response signal, emitted in return by the radio-tag 100, and for deducing therefrom a temperature of the element onto which the radio-tag 100 is fixed.

The radio-tag reader 400 is adapted for accessing a database of correspondence between, on the one hand, a temperature and, on the other, the gain and/or the phase-shift between the interrogation signal emitted and the response signal received in return. This database may be stored in the radio-tag reader, in an internal memory, or the radio-tag reader may access a remote database to find correspondence information between a temperature and a gain and/or phase-shift. The correspondence information may be associated with an identifier of the radio-tag 100 interrogated by the radio-tag reader 400. The identifier may be found during the step for interrogation or reading of the radio-tag 100 by the radio-tag reader 400. The identifier may allow the type of thermistor used in the load of the radio-tag to be found, and a correspondence to be made between, on the one hand, a gain and/or phase-shift and, on the other, a temperature to be deduced therefrom. The thermistor may be of the "Pt1000", "Pt100" or "Pt25" type for example.

Thus, in order to determine the temperature of the element onto which the radio-tag 100 is fixed, the radio-tag reader 400 executes the following steps:
  emit an interrogation signal,
  receive in return a response signal coming from the radio-tag 100 fixed onto the element,
  determine a gain and/or a phase-shift between the interrogation signal and the response signal received in return, and,
  deduce a temperature of the element as a function of the gain and/or of the phase-shift between the interrogation signal and the response signal.

In order to deduce the temperature of the element, the radio-tag reader 400 can find, in a database, a correspondence between, on the one hand, a temperature and, on the other, the gain and/or the phase-shift between the interrogation signal and the response signal.

Following a prior calibration operation, a determination of the slope of a curve of variation of the temperature measured between two times "t1" and "t2" allows a measurement of the flow of warm air, in other words of the speed of the flow of warm air, to be accordingly deduced. In other words, the higher the flow of warm air, the faster the radio-tag 100 reaches the final temperature of the flow of warm air, in other words, the quicker the temperature measured by the radio-tag reader 400 reaches the value of the temperature of the flow of warm air.

If "D" is the slope of the temperature variation curve, then:

$$D = \frac{(Temp2 - Temp1)}{(t2 - t1)},$$

where "Temp2" is the final temperature, at the time "t2", and "Temp1" the initial temperature, at the time "t1". The final temperature "Temp2" corresponds to the temperature of the flow of warm air. The initial temperature "Temp1" is typically the ambient temperature.

It is then possible, following one or more prior calibration steps, to obtain an evaluation or estimation of a flow of air starting from the measured value of "D". In other words, an evaluation of the speed and of the temperature of an air flow may be obtained based on the determination of "D". The operation for calibrating a radio-tag 100 and a radio-tag reader 400 may comprise measurements of the variation of the measured temperature of a radio-tag 100 subjected to an air flow with a predetermined speed and with a predetermined temperature.

Thus, the radio-tag reader 400 may be adapted for determining an estimation of a speed of the air flow as a function of the measured variation of the temperature over time, for example between the times "t1" and "t2".

The radio-tag reader 400 comprises, possibly connected via a communications bus: a processor or CPU (Central Processing Unit); a memory of the RAM (Random Access Memory) and/or ROM (Read Only Memory) type, a storage module of the internal storage type, a radio module and possibly one or more modules of various natures. The radio module is designed to allow the radio-tag reader to send an interrogation radio signal and to receive in return, emitted by a radio-tag, a response radio signal.

The radio-tag reader 400 may also comprise a communications module, for example of the WiFi (Wireless Fidelity) module type allowing the radio-tag reader 400 to connect to a remote server, possibly for accessing a database hosted on this remote server. The database may comprise correspondence data between, on the one hand, a temperature and, on the other, the gain and/or the phase-shift between the interrogation signal emitted by the radio-tag reader 400 and the response signal returned by the radio-tag 100. Said database may also be stored in the storage module of the radio-tag reader 400.

The processor of the radio-tag reader 400 is capable of executing instructions loaded into the memory, for example from the storage module or from the communications module. When the radio-tag reader 400 is powered up, the processor is capable of reading instructions from the memory and of executing them. These instructions form a computer programme causing the implementation, by the processor, of all or part of the procedures and steps of the method for detecting a temperature of an element implemented by the radio-tag reader 400. Thus, all or part of the procedures and steps described in this document may be implemented in the form of software by execution of a set of instructions by a programmable machine, such as a DSP (Digital Signal Processor) or a microcontroller. All or part of the procedures and steps described in this document may also be implemented in hardware form by a machine or a dedicated component, such as an FPGA (Field-Programmable Gate Array) or an ASIC (Application-Specific Integrated Circuit).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An onboard system for detecting a temperature of an element, the system comprising:
   a radio-tag, the radio-tag being fixed onto the element and comprising an antenna, the antenna comprising a load; and
   a radio-tag reader, the radio-tag reader configured to emit an interrogation signal and to receive in return a response signal coming from the radio-tag, to determine at least one of a gain and a phase-shift between the interrogation signal and the response signal, to deduce a temperature of the element as a function of at least one of the gain and of the phase-shift between the interrogation signal and the response signal, and to determine an estimation of a speed of the air flow as a function of the measured variation of the temperature over time,
   wherein the load comprises a thermistor.

2. The system according to claim 1, wherein the radio-tag reader is configured for accessing a database of correspondence between, on the one hand, a temperature and, on the other, at least one of the gain and the phase-shift between the interrogation signal and the response signal.

3. The system according to claim 1, wherein the thermistor comprises a platinum resistance.

4. A radio-tag reader for an onboard system for detecting a temperature of an element, wherein the radio-tag reader is configured to:
   emit an interrogation signal and to receive in return a response signal coming from a radio-tag fixed onto the element,
   determine at least one of a gain and a phase-shift between the interrogation signal and the response signal,
   find in a database a correspondence between, on the one hand, a temperature and, on the other, at least one of the gain and the phase-shift between the interrogation signal and the response signal,
   deduce a temperature of the element as a function of at least one of the gain and of the phase-shift between the interrogation signal and the response signal, and
   determine an estimation of a speed of the air flow as a function of the measured variation of the temperature over time.

5. A method for detecting a temperature of an element, the element comprising a radio-tag, the radio-tag comprising a load comprising a thermistor, the method being executed by a radio-tag reader and comprising:
   emitting an interrogation signal;
   receiving in return a response signal coming from the radio-tag;
   determining at least one of a gain and a phase-shift between the interrogation signal and the response signal;
   deducing a temperature as a function of at least one of the gain and phase-shift; and
   determining an estimation of a speed of the air flow as a function of the measured variation of the temperature over time.

6. The method according to claim 5, further comprising, in order to carry out the step for deducing a temperature as a function of at least one of the gain and phase-shift:
   finding in a database a correspondence between, on the one hand, a temperature and, on the other, at least one of the gain and the phase-shift between the interrogation signal and the response signal.

7. A non-transitory computer-readable means for storing information comprising a computer program, the computer program comprising instructions for implementing, by a processor, the method for detecting a temperature of an element according to claim 5, when the instructions are executed by the processor.

* * * * *